March 7, 1950 W. M. GOODALL 2,499,742

FREQUENCY MODULATION DETECTOR

Filed June 11, 1948

INVENTOR
W. M. GOODALL
BY H. A. Burgess
ATTORNEY

Patented Mar. 7, 1950

2,499,742

UNITED STATES PATENT OFFICE 2,499,742

FREQUENCY MODULATION DETECTOR

William M. Goodall, Oakhurst, N. J., assignor to Bell Telephone Laboratories, Incorporated, New York, N. Y., a corporation of New York Application June 11, 1948, Serial No. 32,441

5 Claims. (Cl. 250—27)

This invention relates to the detection of waves modulated as to their wavelength or frequency.

An object of the invention is to detect frequency-modulated waves by deriving from them voltage components shifted in phase with respect to each other but preferably having substantially the same amplitude, and combining the components to produce the detected wave.

It is common in frequency-modulation detectors to use circuit elements for which the amplitude as well as the phase is a function of frequency. The invention provides a frequency-modulation detector in which the circuit elements have a phase characteristic varying with frequency but an amplitude characteristic substantially independent of frequency. In the detector of this invention, all-pass networks or uniform transmission lines may be used as the phase shift elements.

In the form of the invention to be disclosed herein in detail, two quarter wavelength coaxial lines are used in tandem in a suitably terminated circuit to make three points available at which the waves have three different phases. The voltages at these three points are picked off and combined vectorially to produce an amplitude-modulated wave which is detected in the usual way to derive the modulating signal.

The nature and objects of the invention will be more clearly understood from the following detailed description in connection with the accompanying drawing in which.

Figure 1:
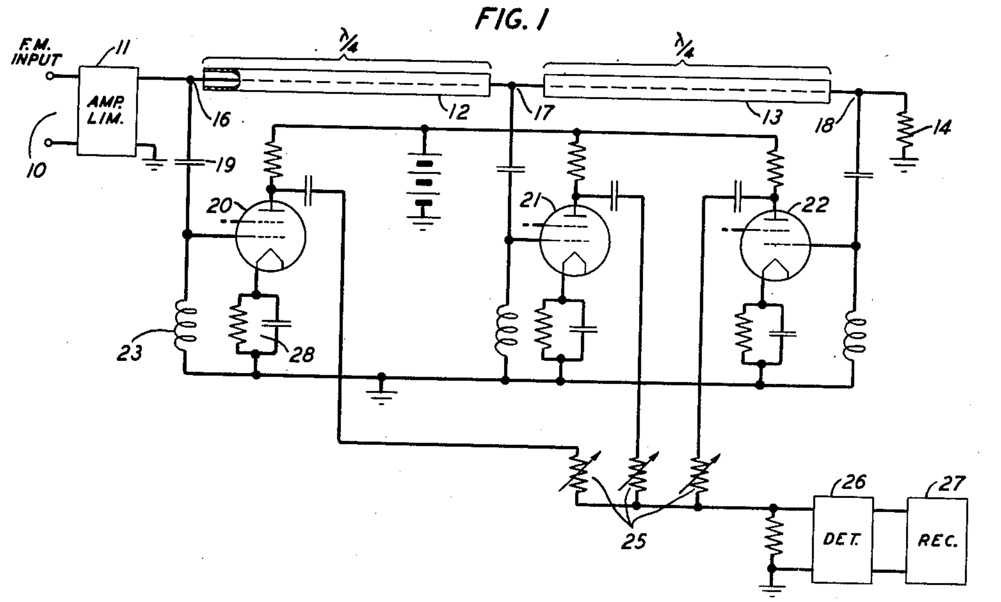
Fig. 1 shows a schematic circuit diagram of the invention in one form.

Referring to Fig. 1, the incoming frequency modulated waves to be detected are applied to the terminals 10 leading to the input of an amplitude limiter 11. The circuit continues through the two quarter wavelength line sections 12 and 13 to the terminating resistance 14 which is of proper value to prevent reflection. Line sections 12 and 13 are disclosed as comprising coaxial conductors and while their length has been specified as equal to a quarter wavelength, they could, if desired, have any odd number of quarter wavelengths such as 3, 5, etc. The wavelength here referred to is that corresponding to the carrier frequency or to the mean frequency of the received waves.

Figure 3:
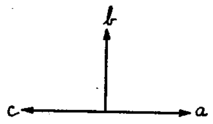

In this way three voltage points 16, 17, 18 are provided at which the phase relations at the mid-frequency or carrier frequency are those represented in Fig. 3 by the three vectors *a*, *b*, *c*. It is noted that the shift in phase from *a* to *b* and also from *b* to *c* is 90 degrees corresponding to that which occurs in a quarter wavelength line section.

The three voltages existing at the points 16, 17 and 18 are separately taken off to the control grids of three vacuum tubes 20, 21 and 22 which have straight-line characteristics and may serve as amplifiers or, if desired, may introduce no gain. The plates or anodes of the three tubes are connected through individual regulating resistors 25 to the common input lead of detector 26 which is followed by any suitable type of receiver 27. By-passed cathode resistor circuits 28 are shown for biasing the control grids of each tube about mid-way of the straight part of the characteristic. The small inductances 23 are for the purpose of compensating the grid cathode capacities of the tubes by resonating with these capacities at the carrier or mean frequency.

Figure 2:
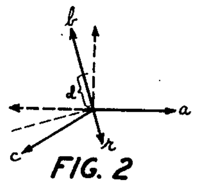
Figs. 2, 3 and 4 show vector diagrams of the phase relations of derived waves under three different conditions.

In the operation of the circuit of Fig. 1, when unmodulated carrier waves are being received or when the received waves have the mean or carrier frequency, the voltage relations are, as already stated, those shown in Fig. 3. During modulation these voltage relations change to one of the two types shown in Figs. 2 and 4, respectively. When the modulating signal at the transmitter swings in one direction, for example in the negative direction, supposing this to increase the carrier wave frequency, the phase shift occurring between points 16 and 17 is greater than in the normal case as indicated in Fig. 2, and the *b* and *c* vectors are shifted counter-clockwise. The phase shift between points 17 and 18 produces a further increment of the same amount in the *c* vector, as indicated in Fig. 2. The effect of combining all three vectors may be seen from first combining vectors *a* and *c* to form the resultant *r* which, in this case, is 180 degrees out of phase with the vector *b*. The vector *r* is then combined with the vector *b* to give the difference indicated by the bracket *d*.

In the normal or unmodulated condition the voltage that was applied to the input of the detector 26 was the voltage *b* of Fig. 3 (since vectors *a* and *c* cancel each other). When the signal modulation is as described in Fig. 2, the voltage applied to the input of the detector 26 drops from the value *b* to the value *d*.

Figure 4:
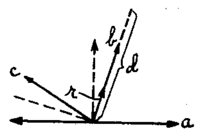

If the signal modulation is in the opposite direction the conditions are represented in Fig. 4. Here the signal modulation reduces the frequency causing a smaller than normal phase shift between the points 16 and 17 and also between the points 17 and 18. The vectors $b$ and $c$ are therefore shifted to the right or clockwise with respect to the normal condition shown in Fig. 3. In this case the resultant between vectors $a$ and $c$ is again $r$ but this vector is now in phase with the vector $b$ so that they directly add together to give the vector of increased length shown by the bracket $d$.

The resistances 25 in Fig. 1 may be used to equalize the voltages applied to the input terminal of the detector 26. The use of the small series coupling condensers 19 serves to minimize the effects of coupling the tubes to the lines so far as possibly influencing the phases at the points 16, 17 and 18 is concerned.

Figure 5:
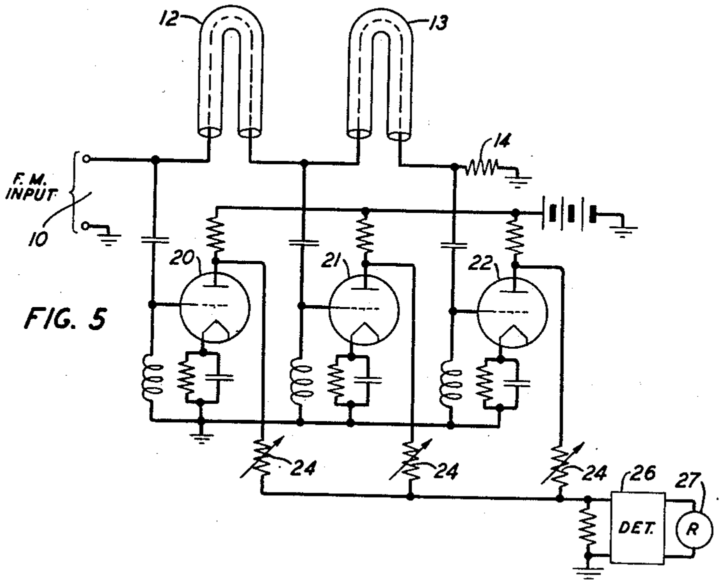
Fig. 5 shows a modified construction of the Fig. 1 circuit.

Fig. 5 shows how the line sections 12 and 13 may be looped so that the tubes 20, 21 and 22 may be located close to each other. This is desirable in order to avoid the phase shifts which would otherwise occur in the leads to the tubes and which might interfere with the proper operation. Fig. 5 is otherwise the same as Fig. 1 and the same description applies.

The detector disclosed is advantageous in wide band transmission such as in the transmission of television. For freqencies between about 20 and 200 megacycles the lines needed are of convenient and practical lengths, but other lengths corresponding to other frequencies are not intended to be ruled out. At 65 megacycles the length of line section 12 or 13 would be about 1.125 meters.

The invention is not to be construed as limited to the details disclosed nor to the magnitudes given since these are intended as illustrative and by way of example rather as limiting and the scope of the invention is defined in the claims.

What is claimed is:

1. A detector for frequency-modulated waves comprising a circuit terminated to avoid reflection and including two line sections in tandem relation for producing ninety-degree phase shift per line section at the mid-frequency of the received waves, a circuit for vectorially combining the three voltages existing at successive line section terminals to produce a voltage wave varying in amplitude, and in amplitude detector for said voltage wave.

2. A detector for frequency-modulated waves comprising a circuit upon which the waves are impressed, a matching resistive termination for said circuit, said circuit including in tandem relation sections of uniform transmission line each of length corresponding to a quarter wavelength at the mean frequency of the received waves, connections from the three terminals of said line sections for deriving from the circuit the three voltages existing on the respective terminals, and for impressing each such derived voltage on the grid of an individual grid-controlled space discharge device, and an amplitude detector connected in common to the anodes of said devices.

3. The method of detecting frequency-modulated waves comprising deriving from three spaced points located a quarter wavelength apart along a uniform transmission line, at the mean frequency of the received waves, three voltages of substantially equal amplitude, vectorially adding said three voltages together to form an amplitude-modulated wave, and detecting said wave.

4. A detector for frequency-modulated wave comprising a wave transmission line terminated at its output end to suppress wave reflection, means for impressing frequency-modulated waves upon the input terminals of the line, voltage deriving circuits connected across the line at three points spaced along the line at equal intervals corresponding to one quarter wavelength at the mean frequency of the frequency-modulated wave, a vacuum tube device having a control grid and an output anode included in each of said circuits and connected to receive the derived voltage upon its control grid, circuit means for combining the outputs of said vacuum tubes and a detector connected to receive the combined outputs and detect the amplitude variations thereof.

5. A detector according to claim 1 in which each line section is looped and each of said successive line section terminals is spaced from its immediately adjacent terminal a distance substantially less than the length of each line section to permit the use of short leads in said voltage combining circuit.

WILLIAM M. GOODALL.

REFERENCES CITED

The following references are of record in the file of this patent:

UNITED STATES PATENTS

| Number | Name | Date |
|---|---|---|
| 2,097,514 | Chaffee | Nov. 2, 1937 |
| 2,100,394 | Heising | Nov. 30, 1937 |
| 2,402,421 | Lindenblad | June 18, 1946 |
| 2,410,006 | Blitz | Oct. 29, 1946 |